O. A. LEHMAN.
COMBINED COLLAR AND BUTTON BOX.
APPLICATION FILED JUNE 13, 1907.

906,638.

Patented Dec. 15, 1908.

Witnesses:
F. George Barry.
Henry Thieme.

Inventor:
Otto A. Lehman
by attorneys
Brown & Seward

UNITED STATES PATENT OFFICE.

OTTO A. LEHMAN, OF HOBOKEN, NEW JERSEY.

COMBINED COLLAR AND BUTTON BOX.

No. 906,638.

Specification of Letters Patent.

Patented Dec. 15, 1908.

Application filed June 13, 1907. Serial No. 378,714.

*To all whom it may concern:*

Be it known that I, OTTO A. LEHMAN, a citizen of the United States, and resident of Hoboken, in the county of Hudson and State of New Jersey, have invented a new and useful Combined Collar and Button Box, of which the following is a specification.

My invention comprises a combined collar and button box having separate compartments for the collars and the buttons, the object being to arrange means for providing a convenient receptacle for the buttons which is so located within the collar box as not to interfere with the collars therein.

Figure 1:
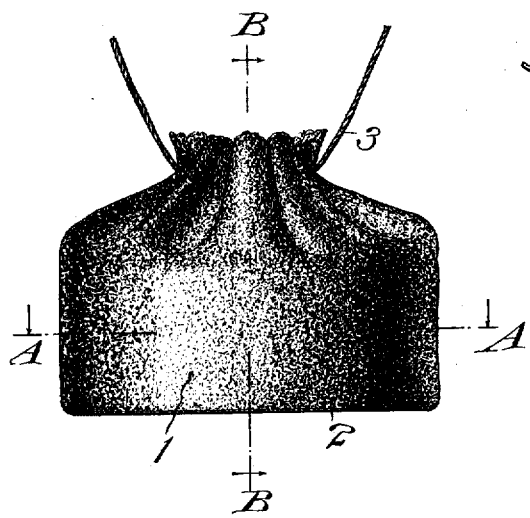
Figure 2:
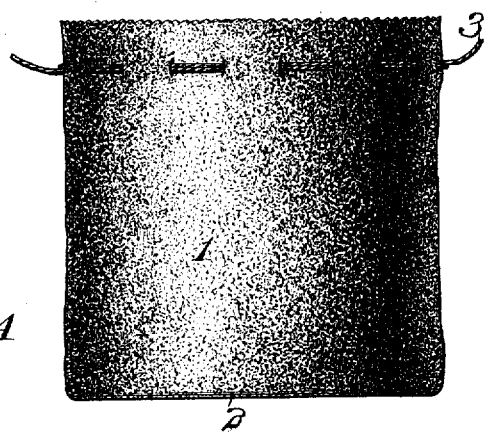
Figure 3:
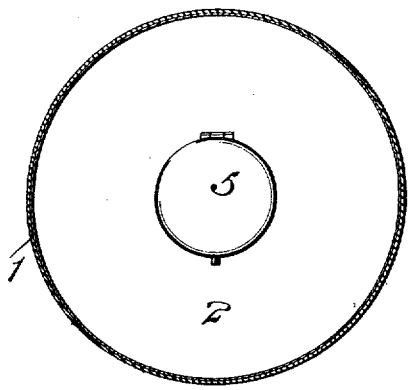
Figure 4:
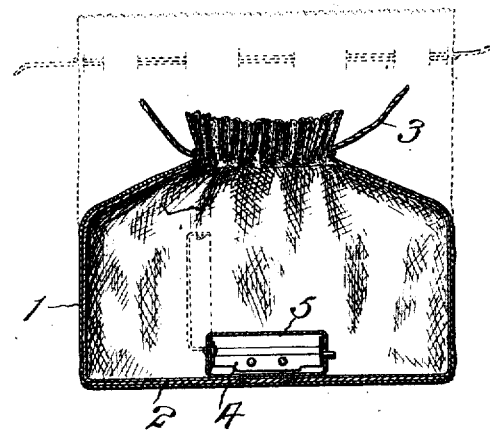

A practical embodiment of the invention is represented in the accompanying drawings in which, Figure 1 represents the combined collar and button box in side elevation in its closed position, Fig. 2 is a similar view with the box in its open position, Fig. 3 is a horizontal section taken in the plane of the line A—A of Fig. 1, looking in the direction of the arrows, and Fig. 4 is a vertical central section taken in the plane of the line B—B of Fig. 1, looking in the direction of the arrows, the position of the box when open being shown in dotted lines.

The collar box is herein shown as being provided with flexible sides 1 and a substantially stiff bottom 2. The collar box is of circular form so as to retain the collars in their normal position therein. The top of the box is opened and closed by a pucker string or cord 3 laced through the flexible side walls 1 of the collar box near the top edges of the same. A button box is located within the collar box and is fixed in a central position on the substantially stiff bottom 2 of the collar box. The body portion of the button box is denoted by 4 and its cover by 5. This button box is arranged centrally so as not to interfere with the collars within the collar box and is also preferably made circular so as not to interfere with the natural position of the collars within the collar box. It will thus be seen that a space within the collar box which cannot be used for collars is utilized by providing a box for the buttons, the said box also serving to help retain the collars in their natural position within the collar box around the said button box.

What I claim is:

As an article of manufacture, a collar box having a substantially stiff bottom of circular form and flexible sides arranged to be spread apart and drawn together to open and close the box, and a button box comprising a body portion fixed in a central position on said circular bottom within the collar box and a cover for opening and closing the button box, said button box serving in conjunction with the sides of the collar box to retain the collars against displacement.

In testimony, that I claim the foregoing as my invention, I have signed my name in presence of two witnesses, this eleventh day of June 1907.

OTTO A. LEHMAN.

Witnesses:
F. GEORGE BARRY,
HENRY THIEME.